(12) United States Patent
Guedalia et al.

(10) Patent No.: US 8,351,419 B2
(45) Date of Patent: Jan. 8, 2013

(54) LOCAL ACCESS TO A MOBILE NETWORK

(75) Inventors: Jacob Guedalia, Newton, MA (US); David Guedalia, Beit Shemesh (IL)

(73) Assignee: Qualcomm Iskoot, Inc., San Diego, CA (US)

( * ) Notice: Subject to any disclaimer, the term of this patent is extended or adjusted under 35 U.S.C. 154(b) by 645 days.

(21) Appl. No.: 11/333,533

(22) Filed: Jan. 18, 2006

(65) Prior Publication Data
US 2006/0258330 A1    Nov. 16, 2006

Related U.S. Application Data

(60) Provisional application No. 60/644,571, filed on Jan. 19, 2005.

(51) Int. Cl.
*H04L 12/66* (2006.01)
(52) U.S. Cl. .............. 370/352; 455/414.1; 455/433
(58) Field of Classification Search .......... 455/414.1, 455/433; 370/352
See application file for complete search history.

(56) References Cited

U.S. PATENT DOCUMENTS

| | | | |
|---|---|---|---|
| 5,875,240 A | 2/1999 | Silverman | |
| 6,073,016 A | 6/2000 | Hulthen et al. | |
| 6,154,465 A | 11/2000 | Pickett | |
| 6,185,184 B1 | 2/2001 | Mattaway et al. | |
| 6,188,762 B1 | 2/2001 | Shooster | |
| 6,233,234 B1 | 5/2001 | Curry et al. | |
| 6,253,075 B1 | 6/2001 | Beghtol et al. | |
| 6,311,073 B1 | 10/2001 | Charpentier et al. | |
| 6,324,263 B1 | 11/2001 | Sherwood et al. | |
| 6,333,931 B1 | 12/2001 | LaPier et al. | |
| 6,496,501 B1 | 12/2002 | Rochkind et al. | |
| 6,564,261 B1 | 5/2003 | Gudjonsson et al. | |
| 6,683,870 B1 | 1/2004 | Archer | |
| 6,697,858 B1 | 2/2004 | Ezerzer et al. | |
| 6,731,630 B1 | 5/2004 | Schuster et al. | |
| 6,757,531 B1 | 6/2004 | Haaramo et al. | |
| 6,807,558 B1 | 10/2004 | Hassett et al. | |

(Continued)

FOREIGN PATENT DOCUMENTS

DE    10341737 A1    4/2005

(Continued)

OTHER PUBLICATIONS

Saravanan Shanmugham, et al., Daniel C. Burnett, "Media Resource Control Protocol Version 2(MRCPv2)", IETF Standard-Working-Draft, Internet Engineering Task Force, IETF, vol. Speechsc, No. 6, pp. 1-176 (2005).

(Continued)

*Primary Examiner* — Phuoc Doan
(74) *Attorney, Agent, or Firm* — Muncy, Geissler, Olds & Lowe, PLLC

(57) ABSTRACT

A method for billing a subscriber to a cellular telephone service for a VoIP call made by the subscriber, the method including determining when a subscriber to a cellular telephone service places a telephone call to a remote device using a local device associated with the subscription, where the telephone call has at least one VoIP call leg, capturing session information related to the telephone call, including information identifying the subscriber, and providing the information to a provider of the cellular telephone service, thereby enabling the cellular telephone service provider to bill the subscriber for the VoIP call.

27 Claims, 4 Drawing Sheets

U.S. PATENT DOCUMENTS

| | | | |
|---|---|---|---|
| 6,829,349 | B1 | 12/2004 | Neale et al. |
| 6,985,569 | B2 | 1/2006 | Baker |
| 7,085,260 | B2 | 8/2006 | Karaul et al. |
| 7,173,910 | B2 | 2/2007 | Goodman |
| 7,239,629 | B1 | 7/2007 | Olshansky et al. |
| 7,274,776 | B1 | 9/2007 | Virzi et al. |
| 7,274,786 | B2 | 9/2007 | Fleischer, III et al. |
| 7,317,716 | B1 | 1/2008 | Boni et al. |
| 7,336,772 | B1 | 2/2008 | Velusamy |
| 7,472,776 | B2 | 1/2009 | Charmat |
| 7,620,404 | B2 | 11/2009 | Chesnais et al. |
| 2001/0038624 | A1 | 11/2001 | Greenberg et al. |
| 2002/0019246 | A1 | 2/2002 | Forte |
| 2002/0068599 | A1 | 6/2002 | Rodriguez |
| 2002/0099670 | A1 | 7/2002 | Jakobsson |
| 2002/0124100 | A1 | 9/2002 | Adams |
| 2002/0129103 | A1 | 9/2002 | Birkler et al. |
| 2002/0132611 | A1* | 9/2002 | Immonen et al. ............ 455/414 |
| 2002/0136206 | A1 | 9/2002 | Gallant et al. |
| 2002/0169984 | A1 | 11/2002 | Kumar et al. |
| 2002/0176374 | A1 | 11/2002 | Lee et al. |
| 2003/0028601 | A1 | 2/2003 | Rowe |
| 2003/0091024 | A1 | 5/2003 | Stumer |
| 2003/0115138 | A1 | 6/2003 | Brown et al. |
| 2003/0118175 | A1 | 6/2003 | Hariri et al. |
| 2003/0167223 | A1 | 9/2003 | Pledereder et al. |
| 2003/0185359 | A1 | 10/2003 | Moore et al. |
| 2003/0194078 | A1 | 10/2003 | Wood et al. |
| 2004/0044771 | A1 | 3/2004 | Allred et al. |
| 2004/0076139 | A1 | 4/2004 | Kang-Yeh et al. |
| 2004/0165714 | A1 | 8/2004 | Pinault |
| 2004/0179669 | A1 | 9/2004 | Gilbert et al. |
| 2004/0202117 | A1 | 10/2004 | Wilson et al. |
| 2004/0203643 | A1 | 10/2004 | Bhogal et al. |
| 2004/0213209 | A1 | 10/2004 | O'Connor et al. |
| 2005/0025043 | A1 | 2/2005 | Mussman et al. |
| 2005/0027716 | A1 | 2/2005 | Apfel |
| 2005/0027867 | A1 | 2/2005 | Mueller et al. |
| 2005/0036597 | A1 | 2/2005 | Kobrosly et al. |
| 2005/0059418 | A1 | 3/2005 | Northcutt |
| 2005/0070230 | A1 | 3/2005 | Das et al. |
| 2005/0088999 | A1 | 4/2005 | Waylett et al. |
| 2005/0163065 | A1 | 7/2005 | Yule |
| 2005/0186960 | A1 | 8/2005 | Jiang |
| 2005/0221847 | A1 | 10/2005 | Brehler et al. |
| 2005/0273512 | A1 | 12/2005 | Cho |
| 2005/0289180 | A1 | 12/2005 | Pabla et al. |
| 2006/0092917 | A1 | 5/2006 | Kucmerowski et al. |
| 2006/0114883 | A1* | 6/2006 | Mehta et al. ............ 370/352 |
| 2006/0167991 | A1 | 7/2006 | Heikes et al. |
| 2006/0168326 | A1 | 7/2006 | Baldwin et al. |
| 2006/0222156 | A1 | 10/2006 | Smith et al. |
| 2006/0236388 | A1 | 10/2006 | Ying et al. |
| 2006/0246877 | A1 | 11/2006 | Kashanian et al. |
| 2007/0005776 | A1 | 1/2007 | Hansen et al. |
| 2007/0071006 | A1 | 3/2007 | Bosch et al. |
| 2007/0112964 | A1 | 5/2007 | Guedalia et al. |
| 2007/0143397 | A1 | 6/2007 | Guedalia et al. |
| 2007/0162350 | A1 | 7/2007 | Friedman |
| 2007/0281676 | A1 | 12/2007 | Borras et al. |
| 2007/0287430 | A1 | 12/2007 | Hosain et al. |
| 2007/0293207 | A1 | 12/2007 | Guedalia et al. |
| 2008/0013531 | A1 | 1/2008 | Elliott et al. |
| 2008/0076409 | A1 | 3/2008 | Hinrikus et al. |
| 2008/0096592 | A1 | 4/2008 | Waytena et al. |
| 2008/0139210 | A1 | 6/2008 | Gisby et al. |
| 2008/0159515 | A1 | 7/2008 | Rines |
| 2008/0222127 | A1 | 9/2008 | Bergin |
| 2008/0263170 | A1 | 10/2008 | Caron et al. |

FOREIGN PATENT DOCUMENTS

| | | | |
|---|---|---|---|
| EP | 1179941 | A | 2/2002 |
| EP | 1517256 | A2 | 3/2005 |
| EP | 1701569 | A | 9/2006 |
| GB | 2391135 | A | 1/2004 |
| WO | 9723083 | | 6/1997 |
| WO | WO9847298 | A2 | 10/1998 |
| WO | 9934628 | A | 7/1999 |
| WO | 0198867 | A2 | 12/2001 |
| WO | 0215030 | A1 | 2/2002 |
| WO | 0221779 | A1 | 3/2002 |
| WO | 0239237 | A | 5/2002 |
| WO | 03032613 | | 4/2003 |
| WO | 03094011 | A1 | 11/2003 |
| WO | 2005065296 | A | 7/2005 |
| WO | 2006/044654 | A | 4/2006 |
| WO | 2006039552 | A2 | 4/2006 |
| WO | 2007001850 | A1 | 1/2007 |
| WO | 2007005124 | A2 | 1/2007 |
| WO | 2007025373 | A | 3/2007 |
| WO | 2007109559 | A2 | 9/2007 |
| WO | 2008013642 | A2 | 1/2008 |

OTHER PUBLICATIONS

Sinnreich, et al., "SIP telephony device requirements and configuration draft-sinnreich-sipdev-req-07.txt", IETF Standard-Working-Draft, Internet Engineering Task Force, No. 7, pp. 1-37 (2005).

Griffin et al., "Integrating SIP, presence and FTP to provide wireless multimedia messaging", Wireless Communications and Networking Conference, IEEE Communications Society, 4:2581-2586 (2004).

Handley et al., "RFC 2543 SIP: Session Initiation Protocol", IETF Standard, Internet Engineering Task Force, pp. 1-153 (1999).

Handley et al., "SIP: Session Initiation Protocol", IETF, Standard-Working-Draft, Internet Engineering Task Force, vol. 4, pp. 1-83 (1997).

Petrie, Pingtel Corp., A Framework for SIP User Agent Profile Delivery draft-iet f-sipping-config-framework-02.txt., IETF Standard-Working-Draft, Internet Engineering Task Force, No. 2, pp. 1-22 (2004).

Colman Ho, "Voice Over Internet Protocol (VoIP) Overview", Presentation to TSACC, Mar. 23, 2004; www.isacc.ca/isacc/_doc/Book%2017%20-%202004/TSACC-04-31305.ppt.

Alcatel-Lucent, "Alcatel-Lucent OmniPCX Enterprise Communication Server: Delivering powerful, reliable and scalable IP communications to drive your 21st century business", 2007. http://www1.alcatel-lucent.com/com/en/appcontent/opgss/ENT_OmniPCX%20Enterprise_datasheet_1007_EN_tcm228-1353221635.pdf.

SIP Connect, "CableLabs Proposal for SIP Connect 1.1", 2007; http://www.sipforum.org/component/option, com_docman/task.doc_view/gid,149/Itemid,75/.

NST, New Standard Telephony, Convergence Simplified, Company Profile, NST 2005; http://www.ns-tel.com/files/ NST_Company_Profile.pdf.

Janne Lundqvist et al., Messaging-over-IP—A network for messaging and information services; http://www.ericsson.com/ericsson/corpinfo/publications/review/1999_03/files/1999035.pdf.

Case Study, Intel Centrino, Mobile Technology, Intel Xeon Processor MP, Shanghai GM, "Seamless Communications", http://www.intel.com/netcomms/technologies/voice/310998.pdf.

Kundan Narendra Singh, Thesis, "Reliable, Sealable and Interoperable Internet Telephony", Columbia University, 2006; http://www1.cs.columbia.edu/~kns10/publication/thesis.pdf.

Intel Communications Alliance, "TeleSym and Intel Deliver Voice-over-Internet-Protocol (VoIP) Enterprise Communication Solution", Jun. 2004; http://www.intel.com/network/csp/pdf/9003wp.pdf.

Sinnreich/Pulver Com H. et al.: "SIP Telephony Device Requirements and Configuration; draft-sinnreich-sipdev-req-08.txt", IETF Standard-Working-Draft, Internet Engineering Task Force, IETF, CH, No. 8, Oct. 1, 2005, XP015043067 ISSN: 0000-0004.

Rosenberg, J. et al.: "SIP: Session Initiation Protocol" 20020601; 20020600; Jun. 1, 2002, pp. 1-269, XP015009039.

Schulzrinne Columbia University B. Volz Ericsson H: "Dynamic Host Configuration Protocol (DHCPv6) Options for Session Initiation Protocol (SIP) Servers; rfc3319.txt", IETF Standard, Internet Engineering Task Force, IETF, CH. Jul. 1, 2003, XP015009189; ISSN: 0000-0003.

Invitation to Pay Additional Fees for PCT/US2006/019135, mailed Oct. 6, 2006.

International Search Report for PCT/US2006/019135, mailed Jan. 16, 2007.

* cited by examiner

LOCAL ACCESS TO A MOBILE NETWORK

CROSS-REFERENCE TO RELATED APPLICATIONS

The present application claims priority from U.S. Provisional Patent Application No. 60/644,571, filed Jan. 19, 2005, and incorporated herein by reference in its entirety.

FIELD OF THE INVENTION

The present invention relates to telecommunications processing in general, and more particularly to the local access of a mobile telecommunication network.

BACKGROUND OF THE INVENTION

Mobile communications networks enable users to communicate while traveling. A typical mobile network includes one or more user cellular telephones, referred to as Mobile Stations (MS), communicating with a radio transceiver, or Base Transceiver Station (BTSC), that is connected to the core network via a Base Station Controller (BSC). The BTSC is usually connected to the BSC via a dedicated communication line, such as a T1 TDM telephone line or microwave link. The BSC in turn is connected to the cellular carrier network.

Unfortunately, the over-the-air bandwidth is limited and may eventually reach saturation. For example, when a large number of users are in the same vicinity their combined traffic may saturate the over-the-air bandwidth, since they all share a limited portion of the radio spectrum for transmission to the BTSC. One current methodology for alleviating the problem is to increase the efficacy of the radio base stations, such as by increasing the number of BTSCs or enhancing their capacities. However, radio spectrum remains an extremely valuable resource, and installation and setup of BTSCs are quite expensive.

Attempts to solve this problem by using radio frequencies not designated for use by cellular telephone networks, such as those employed by the Bluetooth™ or 802.11 standards, require that cellular telephone handsets be adapted to support using these frequencies. A system that utilizes existing cellular telephone handset technologies while increasing communications coverage for cellular network customers would therefore be advantageous.

SUMMARY OF THE INVENTION

In one aspect of the present invention a method is provided for billing a subscriber to a cellular telephone service for a VoIP call made by the subscriber, the method including determining when a subscriber to a cellular telephone service places a telephone call to a remote device using a local device associated with the subscription, where the telephone call has at least one VoIP call leg, capturing session information related to the telephone call, including information identifying the subscriber, and providing the information to a provider of the cellular telephone service, thereby enabling the cellular telephone service provider to bill the subscriber for the VoIP call.

In another aspect of the present invention the determining step includes determining where a first leg of the call is carried by non-cellular telephone infrastructure.

In another aspect of the present invention the method further includes calculating a billing cost incurred by the local device for the call.

In another aspect of the present invention the method further includes debiting a billing record of the subscriber for the billing cost.

In another aspect of the present invention the method further includes crediting an owner of a local network through which call is placed for the billing cost.

In another aspect of the present invention the crediting step includes crediting the owner by crediting an account belonging to the owner at an ISP of the owner.

In another aspect of the present invention a method is provided for billing a subscriber to a cellular telephone service for a VoIP call made by the subscriber, the method including determining when a subscriber to a cellular telephone service places a telephone call to a remote device using a local device associated with the subscription, where the telephone call has at least one VoIP call leg, capturing session information related to the telephone call, including information identifying the subscriber, calculating a billing cost incurred by the local device for the call, and providing the information and the billing cost to a provider of the cellular telephone service, thereby enabling the cellular telephone service provider to bill the subscriber for the VoIP call.

In another aspect of the present invention a system is provided for billing a subscriber to a cellular telephone service for a VoIP call made by the subscriber, the system including a local device configured to place a call to a remote device, and a gateway configured to determine when a subscriber to a cellular telephone service places a telephone call to the remote device using the local device associated with the subscription, where the telephone call has at least one VoIP call leg, capture session information related to the telephone call, including information identifying the subscriber, and provide the information to a provider of the cellular telephone service for billing the subscriber for the VoIP call.

In another aspect of the present invention the local device is configured to place the call at least partially via the non-cellular telephone infrastructure.

In another aspect of the present invention the system further includes a billing logic module configured to calculate a billing cost incurred by the local device for the call.

In another aspect of the present invention the billing logic module is configured to debit a billing record of the subscriber for the billing cost.

In another aspect of the present invention the billing logic module is configured to credit an owner of a local network through which call is placed for the billing cost.

In another aspect of the present invention the billing logic module is configured to credit the owner by crediting an account belonging to the owner at an ISP of the owner.

In another aspect of the present invention a system is provided for billing a subscriber to a cellular telephone service for a VoIP call made by the subscriber, the system including a local device configured to place a call to a remote device, and a gateway configured to determine when a subscriber to a cellular telephone service places a telephone call to the remote device using the local device associated with the subscription, where the telephone call has at least one VoIP call leg, capture session information related to the telephone call, including information identifying the subscriber, calculate a billing cost incurred by the local device for the call, and provide the information and the billing cost to a provider of the cellular telephone service for billing the subscriber for the VoIP call.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1A:
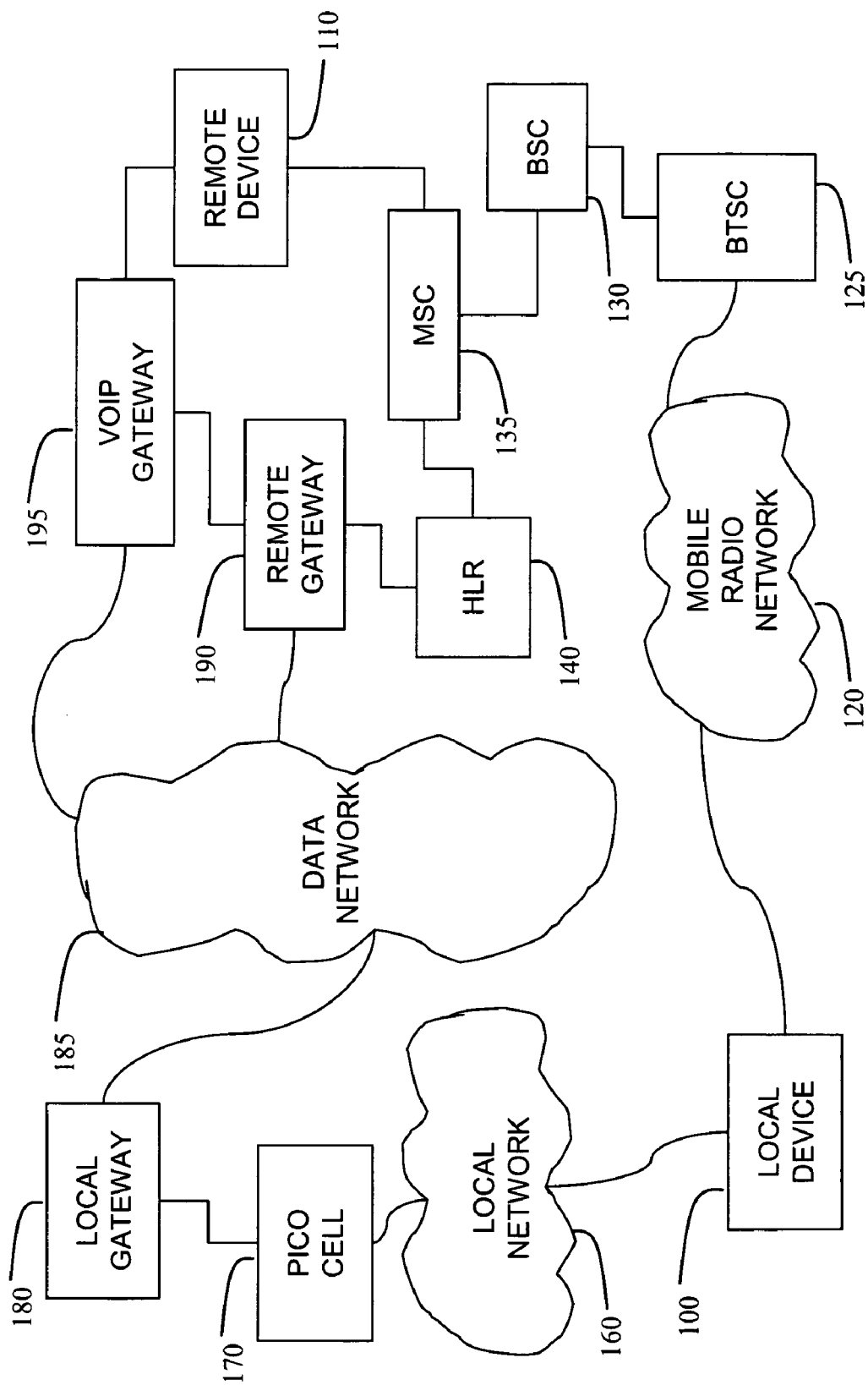
FIG. 1A is a simplified pictorial illustration of a system for local access to a mobile network, constructed and operative in accordance with a preferred embodiment of the present invention.
Figure 1B:
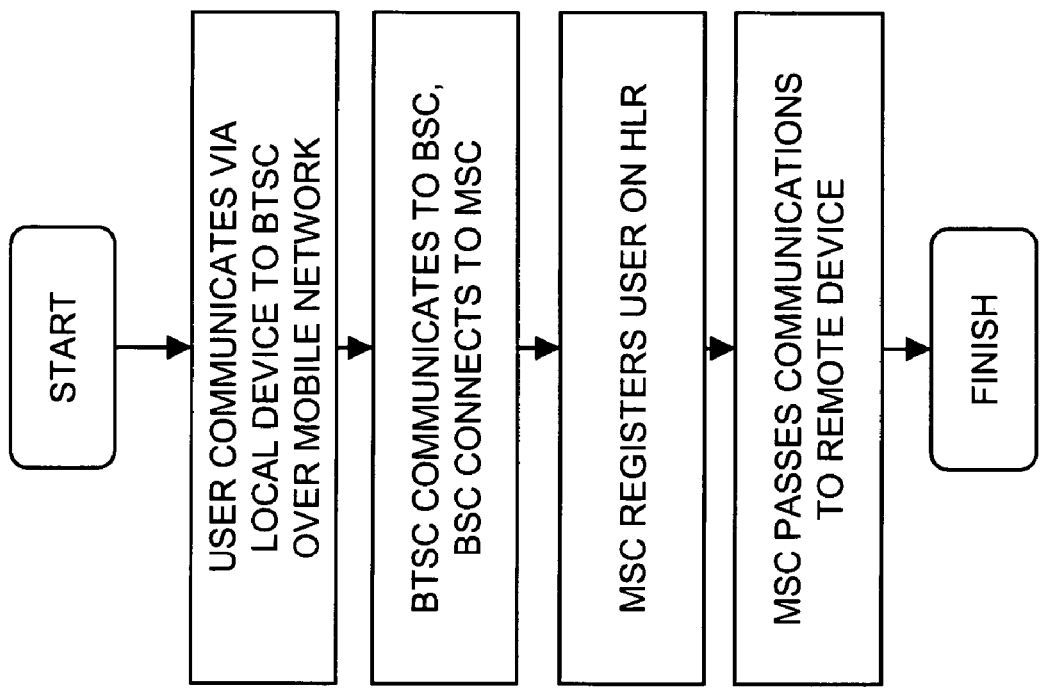
FIG. 1B is a simplified flowchart illustration of a method for mobile network communications, operative in accordance with a preferred embodiment of the present invention.

Reference is now made to FIG. 1A, which is a simplified pictorial illustration of a system for local access to a mobile network, constructed and operative in accordance with a preferred embodiment of the present invention, and to FIG. 1B, which is a simplified flowchart illustration of a method for mobile network communications, operative in accordance with a preferred embodiment of the present invention. In a traditional cellular telephone communications network, such as a GSM network, the location of a local device 100, such as a cellular telephone of a cellular telephone service subscriber, is registered in a home location register (HLR) 140 of the subscriber's network. The registration of local device 100 in the GSM network typically traverses the following path: from the local device 100 over a mobile radio network 120 to a Base Transceiver Station (BTSC) 125, from there to a Base Station Controller (BSC) 130, and then to a Mobile Switching Center (MSC) 135. The MSC 135 registers local device 100 in HLR 140. Should a user of a remote device 110, such as a cellular telephone of a roaming cellular telephone service subscriber or a cellular telephone service subscriber of a different cellular telephone service, dial local device 100's access number, such as local device 100's telephone number, MSC 135 is able to determine local device 100's location based on information available in HLR 140. Thus, when remote device 110 attempts to initiate a communication channel with local device 100, remote device 110 contacts MSC 135, which queries HLR 140 for the location of local device 100 and establishes a communication channel that traverses BSC 130 and BTSC 125 over mobile radio network 120 to local device 100.

Local device 100 is preferably configured to communicate with a pico cell 170 in a local network 160 setting, such as in a local area network environment. Pico cell 170 preferably takes the place of BTSC 125 within local network 160 and is preferably configured to communicate with local device 100, such as via WiFi™, Bluetooth™, or GSM radio signal. Pico cell 170 preferably communicates with a local gateway 180 that is connected to a data network 185, such as the Internet. Local gateway 180 typically communicates utilizing voice over IP (VoIP) protocols, such as SIP and RTP, with a remote gateway 190. For example, local gateway 180 may create a SIP session with remote gateway, notifying remote gateway 190 of local device 100's current location. Remote gateway 190 may then register local device 100 in HLR 140, such as by communicating over PARLAY or SS7 connections. Remote gateway 190 may further identify itself as a Visiting Location Register (VLR) to HLR 140 as described hereinbelow with reference to FIG. 2. At the termination of the SIP session, remote gateway 190 may de-register local device 100 from HLR 140.

Figure 1C:
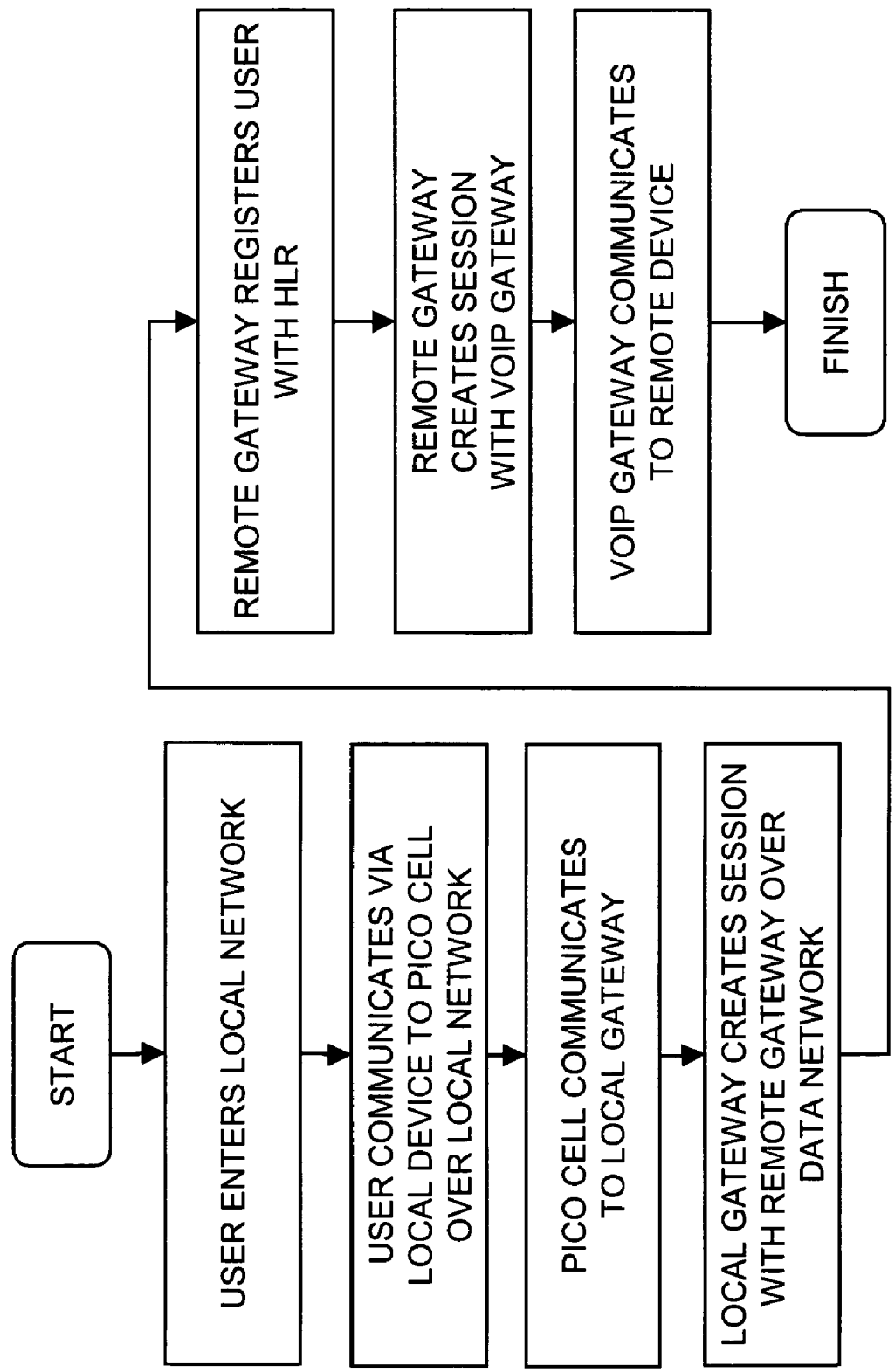
FIG. 1C is a simplified flowchart illustration of a method for local access to a mobile network, operative in accordance with a preferred embodiment of the present invention.

Reference is now made to FIG. 1C, which is a simplified flowchart illustration of a method for local access to a mobile network, operative in accordance with a preferred embodiment of the present invention. In the method of FIG. 1C, should a user employ local device 100 to create a communication channel from within local network 160 to remote device 110, such as a voice phone call, local gateway 180 preferably constructs a SIP session with remote gateway 190, which may then redirect voice traffic through a VoIP gateway 195. In this manner, the user may speak from within local network 160 to a user of remote device 110 that is part of a telephony network, such as a PSTN network, where the call has a VoIP component, or "leg," and where the first leg of the call may be carried by non-cellular telephone infrastructure, such as a home or business WiFi™ local area network. The voice traffic takes the path from local device 100 over local network 160, via pico cell 170, local gateway 180, over data network 185 through VoIP gateway 195, and terminating at remote device 110, with the optional help of remote gateway 190.

Figure 2:
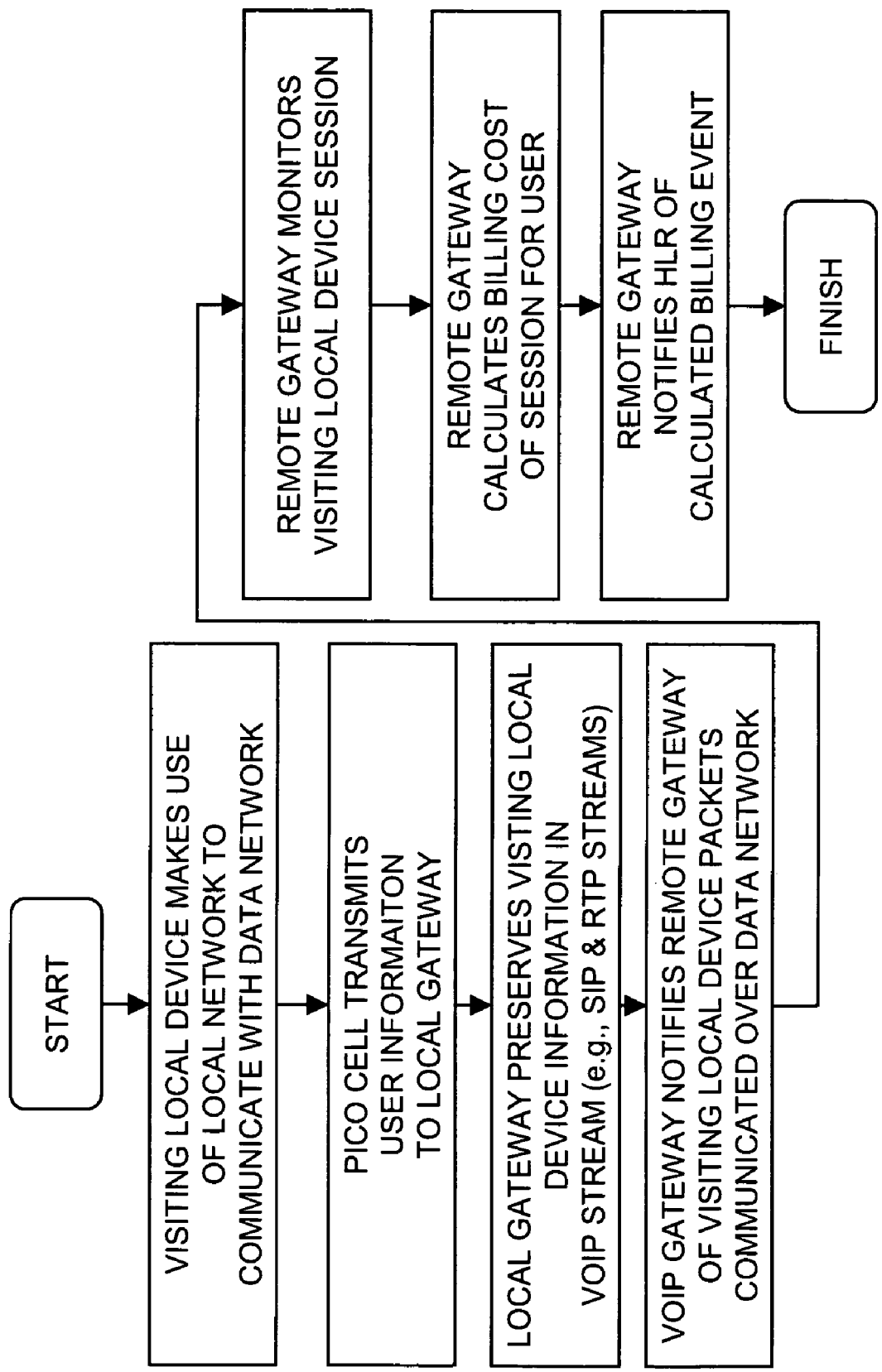
FIG. 2 is a simplified flowchart illustration of an example method for billing mobile telephone users for communications via a local network, operative in accordance with a preferred embodiment of the present invention.

Reference is now made to FIG. 2, which is a simplified flowchart illustration of a method for billing mobile telephone users for communications via a local network, operative in accordance with a preferred embodiment of the present invention. In the method of FIG. 2, a local network 160 may have an associated billing address, such as where Internet access from a home network may be billed to the resident of the home. Communication from local network 160 over data network 185 may incur charges that are then billed to the preferred billing address. For example, an Internet Service Provider (ISP) may charge the owner of local network 160 for each RTP packet transmitted over data network 185, such as to provide an enhanced quality of service for RTP packets based on the charge per packet. In this scenario, when a visitor's local device 100, that is not owned or operated by the owner of local network 160, is connected to data network 185 via local network 160, such as for placing a VoIP call as described above, the billing charges for the visitor's usage of data network 185 will be sent to the owner of local network 160. To avoid this problem, the present invention includes a billing logic module, preferably located within remote gateway 190, described hereinbelow.

When visiting local device 100 utilizes local network 160 to communicate over data network 185, pico cell 170 preferably retrieves the visiting local device 100's information, such as its SIM card ID identifying the subscriber, as well as the device ID, and provides the information in the data transmitted to local gateway 180. Local gateway 180 preferably encodes this information into its outbound data streams. For example, local gateway 180 may embed the information into the SIP 'from' header field or in the RTP packets, within a fixed byte sized. VoIP gateway 195 preferably decodes the visiting local device 100's information and preferably notifies remote gateway 190 of the packets communicated by the visiting local device 100 over data network 185 utilizing local network 160. Alternatively or in conjunction with local gateway 180, remote gateway 190 may monitor local device 100's communications and capture related session information, such as that found in the SIP channel and embedded in the 'from' header field, and determine the visiting local device's utilization of data network 185 via local network 160. Such session information may include information relating to the subscriber, the route a call took, the equipment traversed along the way, when the call was made, the duration of the call, the call's destination, the type of media carried by the call, the cell phone characteristics of the caller and/or the called party, and any other known types of call information. The billing logic module located within remote gateway 190 preferably calculates a billing cost incurred by the visiting local device 100 and debits the visiting local device 100's billing record which may be maintained by remote gateway 190 or by the cellular telephone service provider to whom local device 100's subscriber belongs. The billing logic module may also credit the owner of local network 160 with the same amount charged to visiting local device 100. Alternatively, the billing logic module located within remote gateway 190 provides local device 100's call session information to the cellular, telephone service provider to whom local device 100's subscriber belongs, who then calculates related billing charges and bills the subscriber.

Remote gateway 190 may affect a cellular telephone service subscriber's billing record in the same manner as a traditional VLR affects a billing record in HLR 140, charging network usage to the user of the visiting local device 100.

In addition, remote gateway 190 may retain a connection with data network 185's ISP, and credit the owner of local network 160 directly at the ISP. Alternatively, remote gateway 190 may keep its own billing records, and credit the owner of local network 160 directly.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

We claim:

1. A method for billing a subscriber to a cellular telephone service for a VoIP call made by the subscriber using a wireless local area network, the method comprising:
    receiving said VoIP call via a public data network, said VoIP call originating from said subscriber using a local device that is coupled to said public data network via said wireless local area network;
    decoding at least a portion of said VoIP call to obtain session information related to said VoIP call, said session information including information identifying said subscriber;
    sending said VoIP call to a remote device; and
    sending at least a portion of said session information to a provider of said cellular telephone service, thereby enabling said cellular telephone service provider to bill said subscriber, and not an owner of said wireless local area network, for said VoIP call, wherein said subscriber is a different entity than said owner; and
    initiating a credit to an account associated with said owner of said wireless local area network thereby preventing said owner from incurring charges associated with said VoIP call.

2. The method according to claim 1 further comprising calculating a subscriber billing cost incurred by said owner of said wirelesss local area network for said VoIP call.

3. The method according to claim 2 and further comprising debiting a billing record of said subscriber for said subscriber billing cost.

4. The method according to claim 1 wherein sending said VoIP call to said remote device includes redirecting said VoIP call to said remote device via a VoIP gateway.

5. The method according to claim 1 wherein initiating a credit to said account associated with said owner comprises crediting said owner by crediting an account belonging to said owner at an ISP of said owner.

6. The method of claim 1, said decoding step further comprising decoding device identifying information.

7. The method of claim 1, further comprising decoding identifying information from within a SIP 'From' header.

8. The method of claim 1, further comprising providing subscriber and subscriber device identification information to said provider over a cellular network connection in relation to said VoIP call.

9. The method of claim 8, further comprising providing subscriber information to said provider through both said wireless local area network as well as said cellular network connection.

10. A method for billing a visiting subscriber to a cellular telephone service for a VoIP call made by the subscriber over a host wireless local area network, the method comprising:
    determining when the visiting subscriber to the cellular telephone service places a telephone call to a remote device using a local host wireless local area network, wherein said telephone call has at least one VoIP call leg;
    capturing session information related to said telephone call, including information identifying said visiting subscriber;
    calculating, based upon the session information, a billing cost incurred by said local host wireless local area network for said telephone call;
    initiating a credit to an account associated with an owner of said local host wireless local area network thereby preventing said owner from incurring charges associated with said telephone call, wherein said visiting subscriber is a different entity than said owner; and
    sending said calculated billing cost to said cellular telephone service thereby enabling a cellular telephone service provider to bill said visiting subscriber for said telephone call.

11. A system for billing a subscriber to a cellular telephone service for a VoIP call made to or by the subscriber, the system comprising:
    a remote gateway accessible by a local device through a wireless local area network, wherein the remote gateway is configured to:
        receive said VoIP call via a public data network, said VoIP call originating from said subscriber using said local device that is coupled to said public data network via said wireless local area network;
        capture session information related to said VoIP call, including information identifying said subscriber, and
        redirect said VoIP call to a VoIP gateway to enable said VoIP call to be placed between said local device and a remote device via said VoIP gateway;
        provide said session information to a provider of said cellular telephone service, for billing said subscriber for said VoIP call; and initiate a credit to an account associated with an owner of said wireless local area network thereby preventing said owner of said wireless local area network from incurring charges associated with said VoIP call, wherein said subscriber is a different entity than said owner.

12. The system according to claim 11 wherein said local device is configured to place said VoIP call at least partially via a non-cellular telephone infrastructure.

13. The system according to claim 11 and further comprising a billing logic module configured to calculate a billing cost incurred by said local device for said VoIP call.

14. The system according to claim 13 wherein said billing logic module is configured to debit a billing record of said subscriber for said billing cost.

15. The system according to claim 13 wherein said billing logic module is configured to credit said owner of a local network through which said VoIP call is placed for said billing cost.

16. The system according to claim 15 wherein said billing logic module is configured to credit said owner by crediting an account belonging to said owner at an ISP of said owner.

17. The system of claim 11, said local device comprising a wireless communication device adapted for communication with said wireless local area network and adapted for communication with a cellular wide area network, said wireless local area network and said remote gateway communicating by way of a known Internet protocol.

18. The system of claim 17, said known Internet protocol comprising a RTP packet protocol.

19. The system of claim 17, said remote gateway being coupled by wired Internet-compatible connections to said wireless local area network and coupled by a wired Internet-compatible data network to a local gateway.

20. The system of claim 19, said remote gateway further coupled to a location registry for registering the location of said subscriber within a communication network including said local gateway.

21. A system for billing a subscriber to a cellular telephone service for a VoIP call made by the subscriber using a wireless local area network, the system comprising:
  means for receiving said VoIP call via a public data network, said VoIP call originating from said subscriber using a local device that is coupled to said public data network via said wireless local area network;
  means for decoding at least a portion of said VoIP call to obtain session information related to said VoIP call, said session information including information identifying said subscriber;
  means for sending said VoIP call to a remote device; and
  means for sending at least a portion of said session information to a provider of said cellular telephone service, thereby enabling said provider of said cellular telephone service to bill said subscriber, and not an owner of said wireless local area network, for said VoIP call, wherein said subscriber is a different entity than said owner; and
  means for initiating a credit to an account associated with said owner of said wireless local area network thereby preventing said owner from incurring charges associated with said VoIP call.

22. The system according to claim 21 further comprising means for calculating a subscriber billing cost incurred by said owner of said wireless local area network for said call.

23. The system according to claim 22 and further comprising means for debiting a billing record of said subscriber for said subscriber billing cost.

24. The system according to claim 22 and further comprising means for crediting said owner of said wireless local area network through which said call is placed for said billing cost.

25. The system according to claim 24 wherein said means for crediting comprises means for crediting said owner by crediting an account belonging to said owner at an ISP of said owner.

26. A non-transitory, tangible computer readable storage medium, encoded with processor readable instructions to perform a method for managing power on a mobile device, the method comprising:
  capturing session information related to a telephone call, including information identifying a visiting subscriber;
  calculating, based upon the session information, a billing cost incurred by a local host wireless local area network for said telephone call;
  initiating a credit to an account associated with an owner of said local host wireless local area network thereby preventing said owner from incurring charges associated with said telephone call, wherein said visiting subscriber is a different entity than said owner; and
  sending said calculated billing cost to said cellular telephone service thereby enabling said cellular telephone service provider to bill said visiting subscriber for said telephone call.

27. The non-transitory, tangible computer readable storage medium of claim 26, the method including:
  receiving said telephone call; and
  redirecting said telephone call to a VoIP gateway.

* * * * *